May 3, 1938. C. A. FOX 2,115,908
ROLL GRINDING MACHINE AND METHOD
Filed June 15, 1935  2 Sheets-Sheet 1
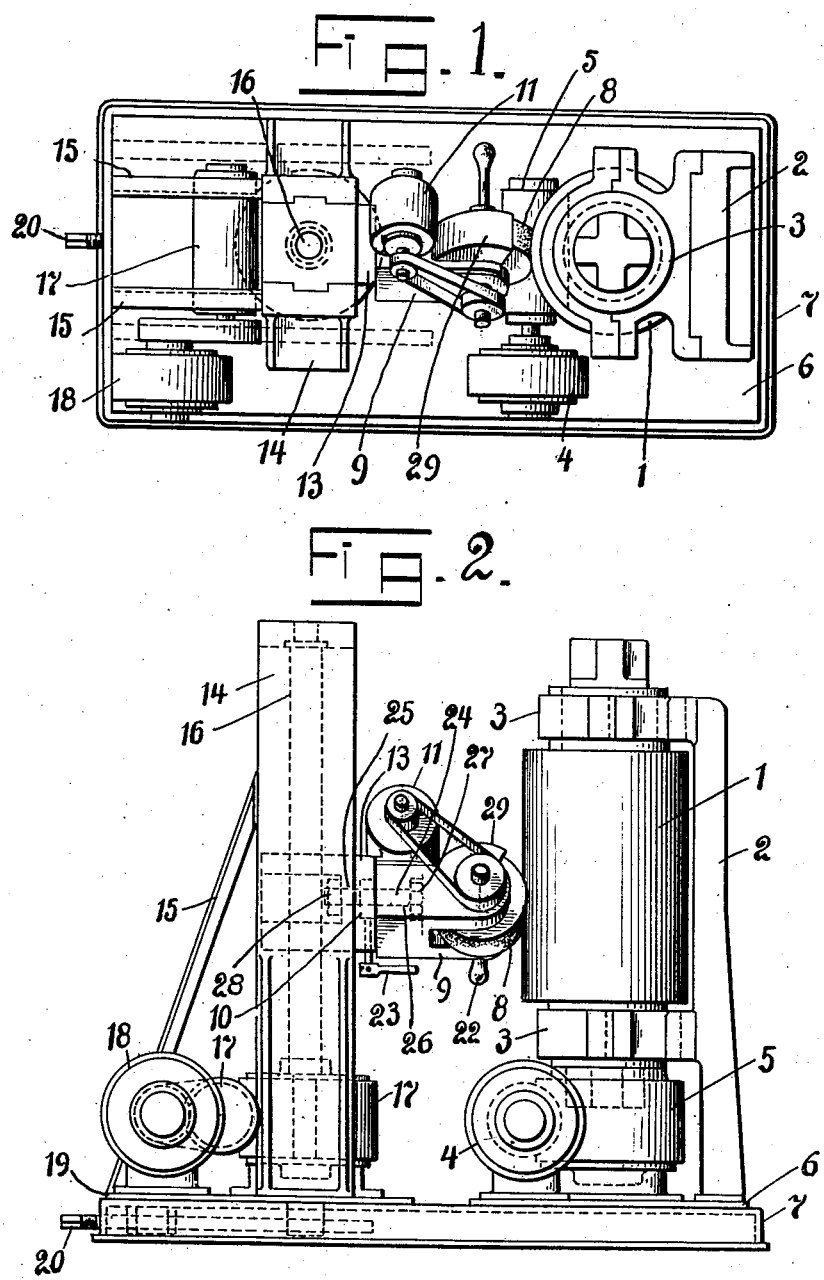
Inventor
Cyril A. Fox
By Maréchal & Noe
Attorney

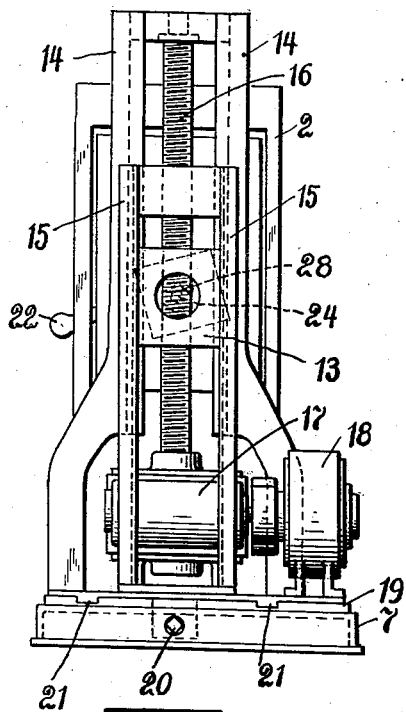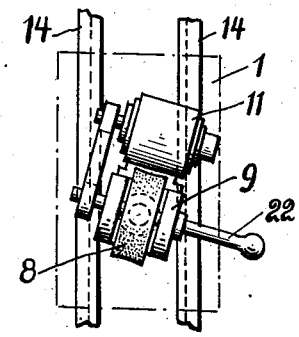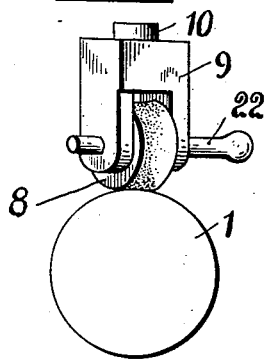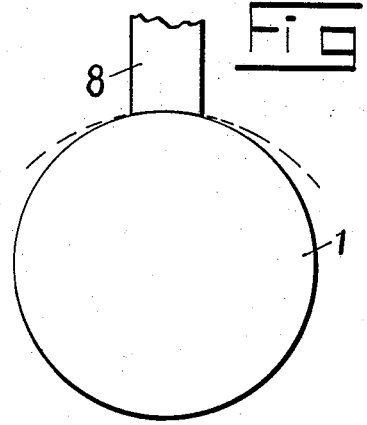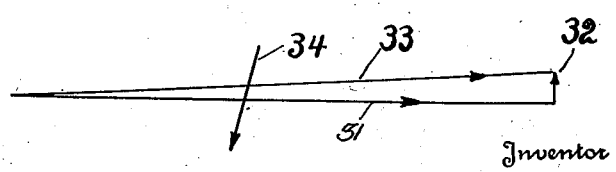

Patented May 3, 1938

2,115,908

UNITED STATES PATENT OFFICE 2,115,908

ROLL GRINDING MACHINE AND METHOD

Cyril A. Fox, Mars, Pa.

Application June 15, 1935, Serial No. 26,722

3 Claims. (Cl. 51—49)

This invention relates to grinding and more particularly to a method and apparatus for grinding a high finish on work pieces which are symmetrically curved about an axis.

One object of this invention is to provide a method and apparatus for revolving a work piece while maintaining a curved grinding contact of substantial length between a grinding element and the work piece, and slowly moving the grinding zone along the length of the work piece to give an improved surface with a finer finish and allowing less precise machine construction and operation.

Another object of this invention is to provide a method and apparatus of the character mentioned in which an elongated work piece revolves about a vertical axis in engagement with a curved grinding surface, preventing flexure between the spindles and eliminating chatter and other troubles.

Other objects and advantages of the invention will be apparent from the following description, the appended claims, and the accompanying drawings, in which,—

Fig. 1 is a top plan view of a grinding machine embodying the present invention;

Fig. 2 is a side elevational view of the machine;

Fig. 3 is an end elevational view of the machine;

Fig. 4 is a fragmental elevational view showing the wheel support assembly in relation to the work piece which is indicated by dot and dash lines;

Fig. 5 is a diagrammatic plan view of the work piece and grinding element;

Fig. 6 is a diagrammatic plan view of the grinder and work piece but with the grinder axis tilted to a horizontal position to show the relative curvature of the grinding surface and work piece; and Fig. 7 is a diagrammatic view indicating relative directions of movement of the parts of the apparatus.

Referring more particularly to the drawings, the invention as herein shown relates to the grinding of a surface of revolution such as a cylindrical or conical surface on a work piece which is revolved in contact with the grinding surface. The grinding surface instead of having the usual cylindrical form with its axis of rotation lying parallel to the axis of rotation of the work piece, is provided with a grinding surface of suitably curved form, and has an inclined axis of rotation so as to give a washing or sweeping action of the grinding grains on the ground area of the work piece to produce a finish of unusual excellence.

The work piece and the grinding mechanism of the present invention are preferably both supported on a common base. The work piece 1 as shown in Fig. 1 of the drawings, is a heavy elongated cylindrical body of metal having extension trunnions or end members. Such a work piece for example may be a metal forming roll or the like. The extending trunnion portions of the roll are rotatably supported on a standard 2 by means of upper and lower bearing members 3 which are preferably mounted for vertical sliding movement on the standard 2, and preferably arranged with detachable side portions so that assembly and removal of the work piece can be readily accomplished. When the work piece is in place, its weight may be taken by the lower bearing 3 or by a suitable bearing provided below the lower end of the roll.

The roll 1 is preferably driven in a positive manner and at a suitable speed by means of a motor 4 which operates the roll through a speed reducing gearing contained in the gear box 5. The rate of speed at which the roll is driven may be chosen within wide limits. In grinding a twenty-four inch diameter roll, for example, a speed of fifty R. P. M. has been found satisfactory. The motor, gear box, and frame or standard are all mounted on a common sub-frame or support 6 which is preferably fixed on the common base 7, the latter also serving for the support of the grinding mechanism.

The surface of the roll 1 is finished by a grinding wheel 8, rotatably mounted in a bracket 9 having a trunnion 10 rotatably mounted in a cross head 13 which is adapted to have feeding movements imparted to it as will be presently described. The grinding wheel 8 is operated by means of an electric motor 11 or the like, the motor being supported preferably directly on the bracket 9. Grinding wheel 8 is preferably driven at a speed considerably in excess of the speed of rotation of the work piece. A speed of the order of 10,000 ft. per minute with a wheel diameter of one or two feet has been found quite satisfactory.

The cross head 13 is movable vertically so as to feed the grinding wheel along the length of the work piece, being carried by a rotatable feed screw 16 and operating along fixed guides 14, the lower ends of which are secured in any suitable manner to a supporting plate 19, and rigidified by inclined braces 15 as shown in Fig. 1. The guides 14 at their upper ends are fixed together by a top block which forms a bearing for the top of the vertical feed screw 16. The feed screw 16 is rotated at a desired speed of operation so as to produce a predetermined slow feeding speed of the grinding wheel by means of a motor 18 which operates the driving screw through speed reducing gearing contained in the gear casing 17, the motor 18 and the gear casing 17 being supported on the plate 19. A feed of about 20 ft. per minute for rough grinding, or about 10 ft. per minute for finishing, has been found satisfactory.

The plate 19 is adapted to be moved to different positions of adjustment, to control the thickness of a grinding cut, and to accommodate rolls of different diameters, by means of an adjusting screw 20 which engages cooperating lugs projecting downwardly from the plate 19 and the base 7 so that rotational movements of the screw, which is rotated in threaded engagement with one of these lugs and rotatable but not axially movable in the other, moves the supporting plate 19 in guideways 21 toward and from the axis of rotation of the work piece 1.

The bracket 9 on which the grinding wheel 8 is carried is adapted to be rotated or adjusted about an axis extending perpendicularly to the work piece axis. Such movement of the bracket 9 can be effected by a handle 22, locking or holding means being provided to normally hold the bracket 9 in any adjusted position. The locking means for example may comprise a detent member movable by a locking handle 23 into engagement with the trunnion 10. The trunnion 10 forms a part of the bracket 9, and together with the bracket 9 may be held against the vertical face of the cross head 13 as by means of the holding bolt 24 extending through a passage 25 in the cross head and the passage 26 in the bracket 9, nuts 27 and 28 serving to hold the bracket in place so that movement of the same is permitted when the unlocking handle 23 has released the detent member from engagement with the trunnion 10.

The grinding wheel 8 as herein shown is partially enclosed by a housing 29.

The face of the grinding wheel 8 is of such curvature that when the axis of rotation of the grinding wheel is inclined to the horizontal, and as shown in Fig. 5, the grinding wheel and work piece will be in contact with one another throughout a curved grinding contact which is substantially equal in length to the width of the grinding wheel. With the surface ground on the work piece 1 a true cylinder, the grinding wheel would have a curvature somewhat less than the curvature of the work piece, as shown in Fig. 6, and of irregular form. This view, however, does not show the work piece and grinding wheel in their grinding positions, but shows the grinding wheel turned so that its axis of rotation is horizontal. Normally, however, the axis of rotation of the grinding wheel is inclined at a substantial angle to the horizontal. The plane of rotation of the grinding wheel as shown in Fig. 4 is less than 45° from the vertical and is preferably about 15° from the vertical although this angle may be considerably varied. This angle between the plane of rotation of the grinding wheel and the axis of rotation of the work piece is quite substantial so that as the grinding wheel is rotated by means of the motor 11, and moved along the length of the work piece by means of the screw 16, a ground surface of revolution will be produced on the work piece from end to end thereof as the latter is rotated about its own axis, and in this operation each area on the surface of the work piece is ground or cut by the grinding grains in a direction which is at an angle from the direction of movement of these grains, because the cut on the work piece of each grain is not in the plane of rotation of that grain, but is modified by both the feeding movement and the work piece rotation. The relative movements of the work piece and the feeding movement of the grinding wheel are represented in Fig. 7, by the arrows 31 and 32 respectively, the resultant 33, indicating relative movement between the area ground and the body of the grinding wheel. The grinding grains, however, move along the line 34 which is at a considerable angle from the resultant line 33. Thus an area to be ground on the work piece approaches the grinding means in a direction at a substantial angle to the plane of rotation of the grinding means, and a washing or sweeping action of the grains of the grinding wheel across the ground area is obtained which produces an unusually fine finish. Any groove or scratch produced by any one grain of the grinding wheel would be instantly smoothed out and reduced by subsequent grinding action of other portions of the grinding wheel. A grinding wheel of coarser texture may, therefore, be used to give a comparatively fine finish.

The grinding contact between the wheel and the work piece covers an area of irregular shape. With a grinding contact and with each part of the wheel cutting to the same depth, each part of the wheel will have its own length of cut, depending on the radius of the wheel at that point, because as the radius increases the length of cut increases for a given depth of cut. The shortest cuts will be taken at the center of the wheel where the radius is smallest, and those nearer the edge of the wheel will be progressively longer.

The curvature of the grinding face of the wheel is preferably such that in operation it gives an about full width contact with the work piece when the wheel supporting bracket 9 is in its predetermined angular position corresponding to the particular curvature of the grinding wheel and diameter of the work piece. However, any particular grinding wheel may be used to grind surfaces of somewhat different diameter, either larger or smaller, by turning the bracket 9 by means of the control handle 22 in one direction or the other so as to give approximately full contact from one side of the grinding wheel to the other and thus allow the wheel to quickly wear to the desired contact. To prevent the edges of the curved grinding face from grooving or tending to groove the work, these edges are rounded off, or dressed back from time to time. The angular adjustment of the wheel axis may also be used to compensate for the wear of the wheel from its original curve. An important feature of this invention resides in the fact that the curve of the grinding wheel need not be exact nor need its angular positioning be accurately chosen. The wheel wears in a short time, during the roughing cut for example, to take the right shape in accordance with the particular angle at which it is set, and in accordance with the diameter of the work piece.

If the curve of the wheel is too flat, the wheel face will tend to wear to a sharper curve, or the angle of the plane of rotation of the grinding wheel from the vertical may be increased to bring the grinding wheel into fuller contact with the work piece. Unusual accuracy in dressing the wheel is therefore not required.

In the usual finishing of rolls or the like, the roll axis is arranged horizontally, but in accordance with the present invention, the heavy roll is arranged in such a manner that the weight of the roll does not tend to deflect the roll axis. As has been previously described, the roll axis is vertical with the upper and lower journals providing for the rotation of the work piece with its longitudinal axis so positioned that there is no tendency for deflection of the roll surface between one end of the roll and the other. In heavy rolls the deflection obtained by the sagging of the central portions of a horizontally arranged roll may be quite appreciable, producing chatter and requiring frequent careful adjustments of the grinding wheel position during grinding. In accordance with the present arrangement however this deflection is entirely eliminated, and the grinding operation produces a much finer finish on the surface of the work piece in a much more perfect surface of revolution, since the axis of the work piece may be supported in a definite predetermined position with a minimum amount of movement permitted and with the consequent reduction in the amount of chatter that could obtain.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. In grinding apparatus of the character described, a base, a work holding assembly comprising a support having vertically aligned bearings for rotatably holding an elongated cylindrical work piece with its longitudinal axis in a vertical position, a reduction gear drive for rotating the work piece, a driving motor for rotating said reduction gear, a guide stand assembly comprising vertical guide members, and a crosshead mounted for vertical movement on said guide members, a feed mechanism assembly comprising a vertical screw engaging said crosshead, a reduction gear drive for rotating said screw, and a driving motor for rotating said reduction gear, a grinding wheel support assembly comprising a bracket attached to said crosshead for adjustment about an axis at right angles to the axis of rotation of said work piece, means for maintaining the position of said bracket with respect to said crosshead, a rotatable grinding wheel carried by said bracket, and a driving motor for said grinding wheel carried by said bracket, a sub-base carried by said base and movable thereon in a direction at right angles to the axis of rotation of said work piece, said guide stand assembly and said feed mechanism assembly being carried by said sub-base.

2. The method of grinding a surface of revolution on a work piece which is substantially symmetrical about an axis, which comprises rotating the work piece about its axis while establishing a curved grinding contact on a face of the work piece between said work piece and grinding grains having movement in a plane inclined considerably less than 45° to the axis of rotation of the work piece, moving the grinding contact through a helical path of small pitch on the face of said work piece, and grinding the work piece so that each grinding grain cuts in a direction at a substantial angle to the transverse plane through the axis of the work piece and at a substantial angle to the helical path.

3. In grinding apparatus of the character described, a base, means on said base for supporting an elongated work piece of circular cross section for rotation about its elongated axis, means for rotating the work piece about said axis, a rotatable grinding wheel mounted on said base for grinding movement in a plane inclined considerably less than 45° to the axis of rotation of the work piece, said grinding wheel having a curved face with a curvature of the order of the curvature of the work piece, and means for relatively moving the grinding wheel and the work piece to slowly move the grinding zone along the work piece in a direction parallel to said axis to repeatedly grind some portions of the work piece.

CYRIL A. FOX.